(12) United States Patent
Raghav et al.

(10) Patent No.: US 11,513,808 B2
(45) Date of Patent: Nov. 29, 2022

(54) AUTOMATIC SWITCHING AND DEPLOYMENT OF SOFTWARE OR FIRMWARE BASED USB4 CONNECTION MANAGERS

(71) Applicant: Intel Corporation, Santa Clara, CA (US)

(72) Inventors: Vinay Raghav, Folsom, CA (US); Prashant Sethi, Folsom, CA (US); Robert Gough, Beaverton, OR (US); Reuven Rozic, Binyamina (IL); Uri Soloveychik, Had Hasharon (IL)

(73) Assignee: Intel Corporation, Santa Clara, CA (US)

( * ) Notice: Subject to any disclaimer, the term of this patent is extended or adjusted under 35 U.S.C. 154(b) by 584 days.

(21) Appl. No.: 16/456,931

(22) Filed: Jun. 28, 2019

(65) Prior Publication Data
US 2019/0317774 A1    Oct. 17, 2019

(51) Int. Cl.
*G06F 9/4401* (2018.01)
*G06F 13/38* (2006.01)
*G06F 1/3215* (2019.01)

(52) U.S. Cl.
CPC .......... *G06F 9/4403* (2013.01); *G06F 1/3215* (2013.01); *G06F 9/4406* (2013.01); *G06F 9/4411* (2013.01); *G06F 13/382* (2013.01); *G06F 2213/0042* (2013.01)

(58) Field of Classification Search
CPC .... G06F 9/4403; G06F 9/4406; G06F 9/4408; G06F 9/4411; G06F 9/445; G06F 1/3215; G06F 2213/0042; G06F 2213/0052
See application file for complete search history.

(56) References Cited

U.S. PATENT DOCUMENTS

| 9,253,034 | B1* | 2/2016 | Krishnamurthy ... H04L 41/0843 |
| 10,122,576 | B2* | 11/2018 | Bhesania ............ H04L 41/0803 |
| 2007/0157015 | A1* | 7/2007 | Swanson ............... G06F 9/4401 713/2 |
| 2019/0121771 | A1* | 4/2019 | Kadgi .................. G06F 13/409 |

* cited by examiner

*Primary Examiner* — Raymond N Phan
(74) *Attorney, Agent, or Firm* — Compass IP Law PC

(57) ABSTRACT

Automatic-switching and deployment of software (SW)- or firmware (FW)-based USB4 connection managers (CMs) and associated methods, apparatus, software and firmware. A handshake is defined between BIOS and an operating system (OS) to discover supported CM capability and dynamically switch from a FW CM to a SW CM and visa verse if there is a mismatch. In addition, a mechanism is defined to deploy the correct FW or SW CM driver based on class code, 2-part or 4-part ID. Support for continued USB4 operation during an OS upgrade or downgrade is provided, while ensuring that the best possible CM solution is used based on the advertised platform and OS capability. USB4 controllers support a pass-through mode under which the host controller FW redirects control packets sent between an SW CM and a USB4 fabric, and a FW CM mode under which control packets are communicated between the host controller FW and the USB4 fabric to configure USB4 peripheral devices and/or USB4 hubs in the USB4 fabric.

24 Claims, 14 Drawing Sheets

AUTOMATIC SWITCHING AND DEPLOYMENT OF SOFTWARE OR FIRMWARE BASED USB4 CONNECTION MANAGERS

BACKGROUND INFORMATION

Universal Serial Bus (USB) is an industry standard that establishes specifications for cables, interfaces and protocols for connection, communication and power supply between USB hosts (e.g., computers, mobile devices), peripheral devices and other device such as USB hubs. The USB standard is defined by three generations of USB specifications: USB 1.x, USB 2.0, and USB 3.x. A fourth generation called USB4 has been under development by the USB 3.0 Promoter Group and is scheduled to be published in Q3 of 2019 (first version USB 4.0; the current working draft is Draft Version 0.95). The USB4 architecture is based, in part, on the Thunderbolt® 3 protocol specification, which was recently open-sourced by Intel® Corporation. USB4 supports 40 Gbit/s throughput and is compatible with USB 3.2, USB 2.0 and Thunderbolt® 3. The architecture defines a scheme for sharing a single high-speed link with multiple end device types dynamically that best serves the transfer of data by type and application.

Currently, a firmware (FW)-based Thunderbolt® connection manager (CM) is provided (with Intel®-based platforms) to assist with setup and enumerations of Thunderbolt® peripherals (amongst other functions). With USB 4.0, third party silicon vendors are expected to also ship their own host controllers. In order to allow for interoperability amongst these various host and device silicon, a hardware agnostic software (SW)-based connection manager that is natively supported in the Operating System (OS) has been proposed and is being developed. It is also envisioned that a USB 4.0 compliant FW-based connection manager will also be available. This solution will also be required for legacy OS versions that do not have a native SW connection manager solution.

SW and FW CMs are mutually exclusive. If the system is setup to use a FW CM, then both BIOS pre-boot (such as UEFI (Universal Extensible Firmware Interface)) and operating system (OS) environments should operate in the same mode and vice versa. Depending on the operating system version, platform FW capability and OEM (Original Equipment Manufacturer) requirements, a solution that will allow switching between FW- and SW-based connection managers may be needed or otherwise would be advantageous. This switching might be employed during an OS upgrade, OS downgrade or dual boot scenarios. Such switching should aim to keep the connection manager mode similar in BIOS and the OS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
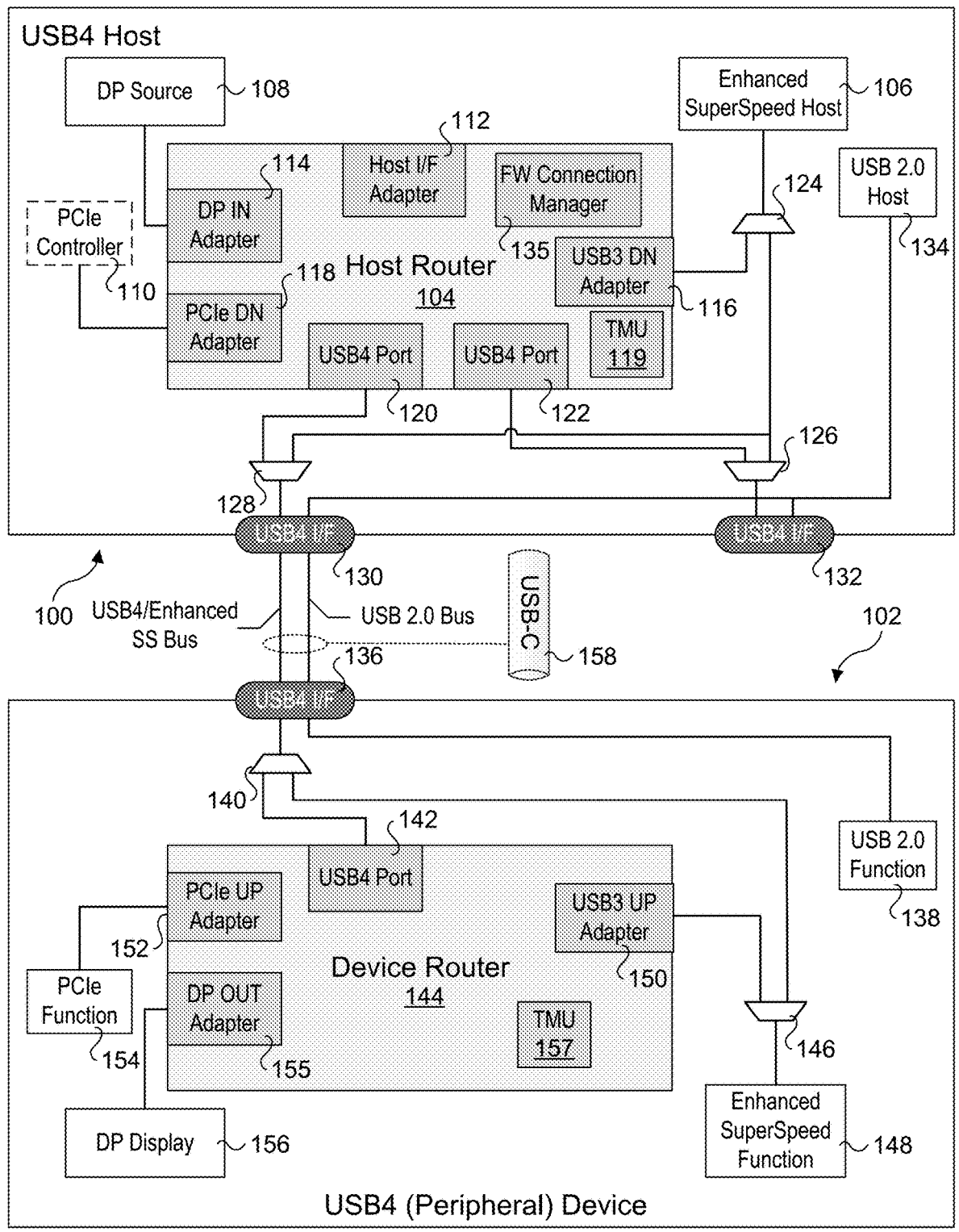
FIG. 1 is a schematic diagram of a USB4 host including a firmware-based Connection Manager (FW CM) coupled to a USB4 peripheral device, in accordance with one embodiment.

Embodiments of automatic-switching and deployment of software (SW)- or firmware (FW)-based USB4 Connection Managers (CMs) and associated methods, apparatus, software and firmware are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described and illustrated herein, techniques for implementing automatic switching and deployment of software- and firmware-based USB4 Connection Managers and disclosed. A handshake is defined between BIOS and an operating system (OS) to discover supported CM capability and dynamically switch from a FW CM to a SW CM and visa verse if there is a mismatch. In addition, a mechanism is defined to deploy the correct FW or SW CM driver based on class code, 2-part or 4-part ID. Support for continued USB4 operation during an OS upgrade or downgrade is provided, while ensuring that the best possible CM solution is used based on the advertised platform and OS capability.

Brief Overview of Selective Aspects of USB4

USB4 as defined in the USB 4.0 Specification is similar to earlier versions of USB in that it is a cable bus supporting data exchange between a host computer or device (referred to herein as a host platform) and a wide range of simultaneously accessible peripherals. However, USB4 also allows a host computer to setup data exchange between compatible peripherals. The attached peripherals share bandwidth through a host-managed scheduling protocol. The bus allows peripherals to be attached, configured, used, and detached while the host and other peripherals are in operation.

When configured over a USB Type-C connector interface, USB4 functionally replaces USB 3.2 while retaining USB 2.0 bus operating in parallel. Enhanced SuperSpeed USB, as defined in USB 3.2, remains the fundamental architecture for USB data transfer on a USB4 Fabric. The difference with USB4 versus USB 3.2 is that USB4 is a connection-oriented, tunneling architecture designed to combine multiple protocols onto a single physical interface, so that the total speed and performance of the USB4 Fabric can be dynamically shared. USB4 allows for USB data transfers to operate in parallel with other independent protocols specific to display, load/store and host-to-host interfaces. Additionally, USB4 extends performance beyond the 20 Gbps (Gen 2×2) of USB 3.2 to 40 Gbps (Gen 3×2) over the same dual-lane, dual-simplex architecture.

The USB 4.0 Specification introduces the concept of protocol tunneling to USB bus architecture. Besides tunneling Enhanced SuperSpeed USB (USB3), display tunneling based on DisplayPort (DP) protocol and load/store tunneling based on PCI Express (PCIe) are defined. These protocol tunnels operate independently over the USB4 transport and physical layers. Additionally, USB4 allocates packets for bus configuration and management, and packets can be allocated specifically for host-to-host data connections.

FIG. 1 shows exemplary components and blocks for a USB4 Host 100 and a USB4 peripheral device 102 supporting the dual bus architecture of USB3.2 as augmented by USB4 and further including a FW CM, according to one embodiment. Generally, a USB4 Host will include a Host Router (104), an enhanced SuperSpeed USB host controller (106), and a DisplayPort source (108). A USB Host can also optionally include a PCIe controller (110). Host router 104 includes a host interface (I/F) adapter 112, a DisplayPort (DP) input (IN) adapter 114 coupled to DP source 108, a USB downstream (DN) adapter 116, a PCIe DN adapter 118 coupled to PCIe controller 110, a Time Management Unit (TMU) 119, and a pair of USB ports 120 and 122. Enhanced SuperSpeed Host 106 is coupled to a multiplexer (MUX) 124 having one of its outputs coupled to USB DN adapter 116, while the other MUX output is coupled as respective inputs to MUXes 126 and 128. USB4 port 120 is coupled to MUX 128, while USB4 port 122 is coupled to MUX 126. The output of MUX 128 is coupled to a downstream USB4 interface 130, while the output of MUX 126 is coupled to a downstream USB4 interface 132. A USB 2.0 Host 134 is also coupled to each of downstream USB4 interfaces 130 and 132.

Under the USB 4.0 (Draft) Specification, the connection manager may be implemented in the Host system software (an "external Connection Manager," also referred to as a SW CM herein), or it may be implemented in Host Router firmware or hardware (an "embedded Connection Manager," also referred to as a FW CM herein when implemented in firmware). Under the embodiment of FIG. 1, a FM CM is employed, as depicted by FW connection manager 135.

A USB4 peripheral device has a single upstream facing port and does not have any downstream facing ports. A USB4 peripheral device contains a Device Router and can also optionally contain one or more of the following:

An Enhanced SuperSpeed hub or endpoint
A PCIe switch or endpoint
A DisplayPort Source or Sink A depicted in FIG. 1, USB4 peripheral device 102 includes an upstream USB4 interface 136 coupled to a USB 2.0 function block 138 and a mux 140. Mux 140 is coupled to a USB4 port 142 on a device router 144 and to a mux 146 that is coupled to an enhanced SuperSpeed function block 148. A USB3 upstream (UP) adapter 150 on device router 144 is also connected to mux 146. Device router 144 further includes a PCIe upstream adapter 152 connected to a PCIe function block 154, a DisplayPort output (OUT) adapter 155 coupled to a DP display 156, and a TMU 157.

Downstream USB4 interface 130 is connected to upstream USB4 interface 136 via a composite cable 158 which includes wiring to implement a USB 2.0 bus and a USB4/Enhanced SuperSpeed (SS) bus. In one embodiment each of USB4 interface 130 and upstream USB4 interface 136 are USB Type-C (USB-C) receptacles, while composite cable 158 is a USB-C cable in the illustrated embodiment.

The Router is a fundamental building block of the USB4 architecture. A Router maps Tunneled Protocol traffic to USB4 packets and routes packets through the USB4 Fabric. A Router also distributes and synchronizes time throughout the USB4 Fabric via its Time Management Unit. A Router is discovered and configured by a Connection Manager located within the USB4 host (such as depicted by Connection Manager 135 in FIG. 1). The Router includes a flat point-to-point, configurable switch to create (configurable) internal paths between adapters. Each instance of a USB4 host, hub, or peripheral device generally includes one Router.

Each Router contains up to 64 Adapters. Adapters provide an interface between a router and an external entity. There are three types of Adapters: Protocol Adapters, Lane Adapters, and Control Adapters. A Protocol Adapter is used to translate between a supported native protocol and a USB4 tunnel. There are four types of Protocol Adapters: USB3 Adapters, DisplayPort (DP) Adapters, PCIe Adapters, and Host Interface (HI) Adapters.

A Lane Adapter provides an interface for a Lane. A USB4 Port has one Lane Adapter per Lane. A Router contains one Control Adapter. The Control Adapter is a logical Adapter and does not have a physical layer. The Control Adapter is the final consumer of Control Packets that are targeted to the Router. The Control Adapter also generates Control Packets, which are sent to the Connection Manager.

A USB4 Port is the entity that provides the USB4 functional interface that resides on each end of a USB4 Link. It consists of the transmit and receive Lanes of the USB4 data bus along with a two-wire Sideband (SB) Channel (SBTX/SBRX). USB4 Ports operate as either a Single-Lane Link or a Dual-Lane Link and are coupled to physical USB interfaces, such as USB-C receptacles and USB-C plugs.

The primary communication channel of the USB4 Fabric is over the USB4 Link that interconnects two USB4 Ports. The USB4 Link transports packets for both tunneled protocol traffic and bus management traffic between Routers. The Sideband Channel of a USB4 Port is used to initialize and manage the USB4 Link between the USB4 Ports.

Figure 2A:
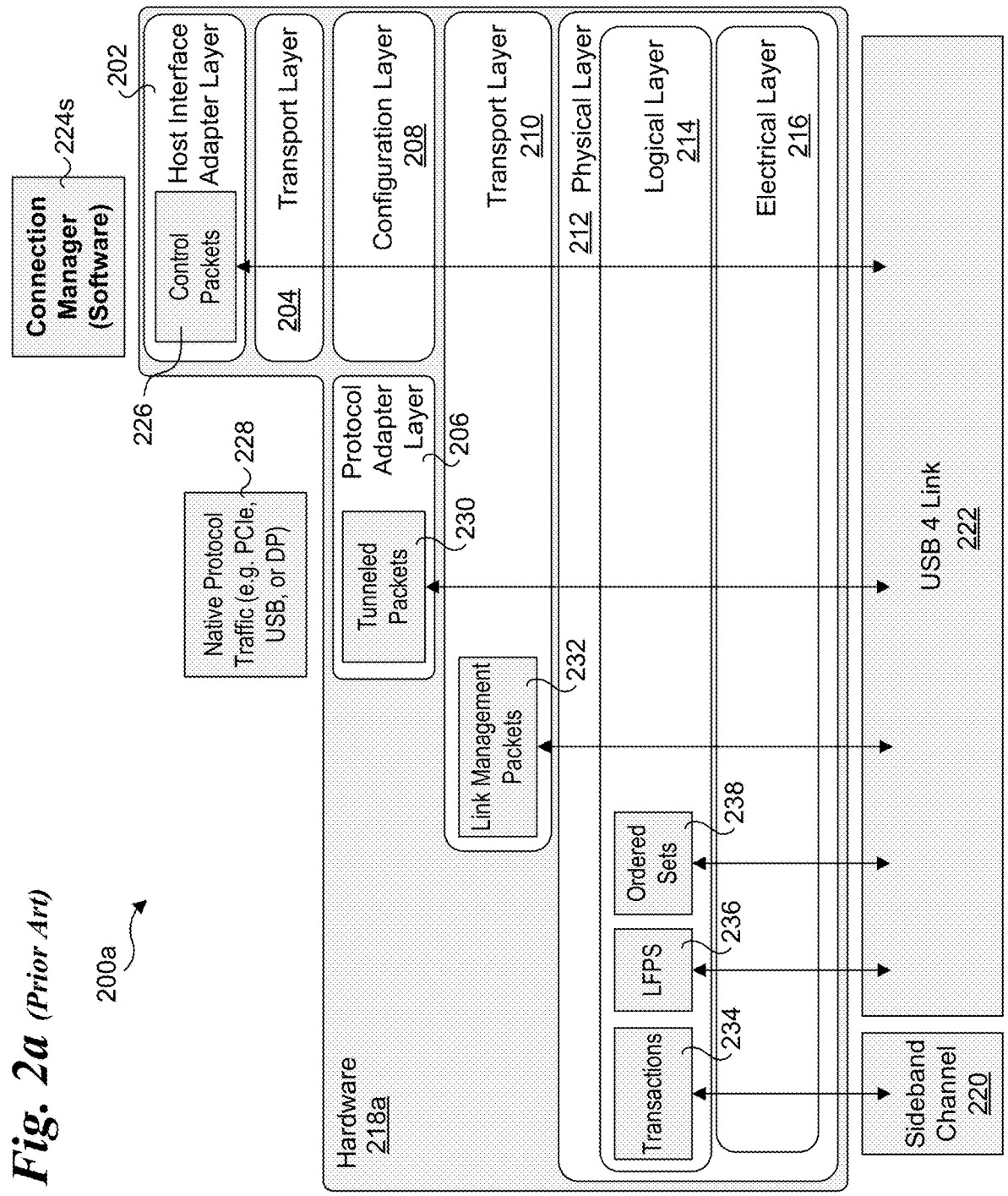
FIG. 2a is a block diagram depicting USB4 communication by functional layer including a software-based (SW) CM, in accordance with the USB 4.0 Specification.
Figure 2B:
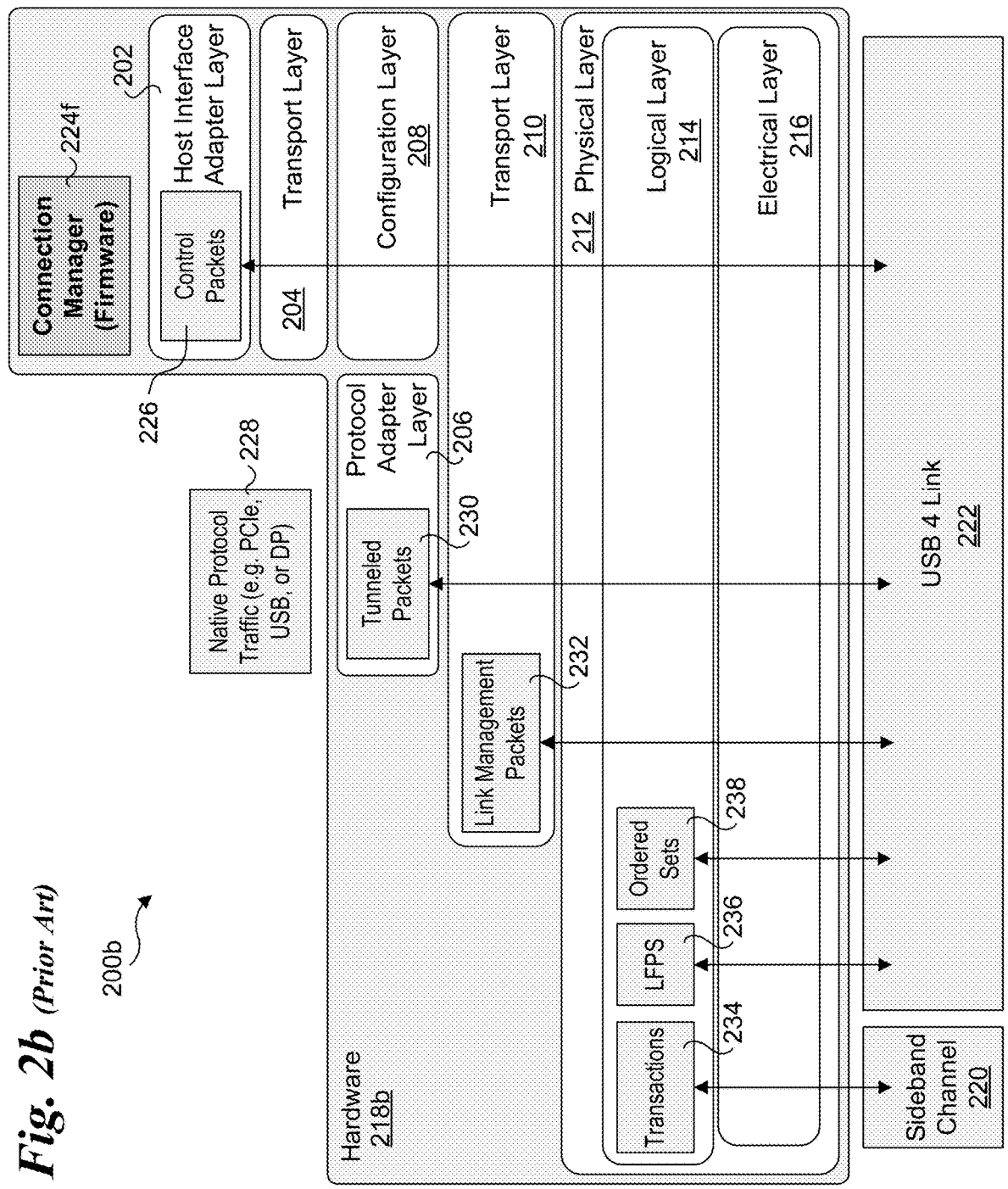
FIG. 2b is a block diagram depicting USB4 communication by functional layer employing a FW CM, in accordance with one embodiment.

FIGS. 2a and 2b respectively show a diagrams 200a and 200b depicting USB4 communication by functional layer, wherein diagram 200a includes a SW CM and diagram 200b includes a FW CM. The layers include a host interface adapter layer 202, a transport layer 204, a protocol adapter layer 206, a configuration layer 208, a transport layer 210, and a physical layer 212 including a logical layer 216 and an electrical layer 216. Each of the foregoing layers are implemented in hardware 218a. A sideband channel 220 and a USB4 link 222 are depicted at the bottom of diagram 200. Diagram 200a further depicts a software-based Connection Manager 224s, control packets 226, native protocol traffic 228, tunneled packets 230, link management packets 232, transactions 234, LFPS 236, and ordered sets 238. Diagram 200b is similar to diagram 200a, except an embedded FW connection manager 224f is implemented in hardware 218b rather than a SW CM.

Electrical layer 216 defines electrical signaling characteristics of a USB4 Link including scrambling, encoding, jitter, and voltage. Logical layer 214 establishes a USB4 Link between two Routers and provides services to transmit and receive streams of bytes between them. Logical layer 214 treats the traffic to and from transport layer 212 as a byte stream.

Transport layer 212 forwards tunneled packets 230 and control packets 226 through the bus. It defines packet format, routing, Quality-of-Service (QoS) support, flow control, and time synchronization, and is the layer in which protocol MUXing is performed.

Configuration layer 208 performs Router configuration tasks and handles incoming control packets 226. It provides an addressing scheme for control packets within the domain, processes control packets, and delivers a reliable transport mechanism for control packets. Control packets 226 provide Connection Manager 224 with access to the configuration spaces of a Router.

Protocol adapter layer 206 performs mapping between tunneled protocol traffic and USB4 Transport Layer Packets. A Protocol adapter layer is defined by the type of tunneled protocol traffic it sends and receives.

Control packets 226 are used by a Connection Manager to provide the Connection Manager with access to the configuration spaces of a Router to configure and manage the Routers across the bus. They are also used by a Router to communicate with a Connection Manager. Control packets 226 are routed over the bus based on a route string that identifies a Router's position in a Spanning Tree. When a control packet originates from a Connection Manager, the Router String identifies the Router that the packet is targeted to. When a control packet originates from a Router, the Router String identifies the Router that sent the packet.

Protocol traffic is encapsulated and tunneled over the USB4 Fabric in tunneled packets 230. Tunneled Packets traverse the USB4 Fabric along one or more paths. Link management packets 232 are confined to a single USB4 Link. Link management packets originate in the transport layer of the Router at one end of the link and terminate in the transport layer of the Router at the other end of the link. Link management packets 232 include time sync packets, flow control packets, and idle packets. Logical layer 214 uses ordered sets 238 for tasks such as symbol synchronization, link training, and de-skew between lanes. Ordered Sets are 66-bit symbols (at Gen 2 speed) or 132-bit symbols (at Gen 3 speed).

Sideband channel 220 handles lane initialization, connection or disconnect on a USB4 port, lane disabling and enabling, and entry to and exit from sleep state. Sideband channel 220 is a packet-based channel; sideband channel packets are called transactions 234 to distinguish them from USB4 Link packets.

A Connection Manager 224 is the entity responsible for managing and configuring a domain. The Connection Manager communicates with Routers in a domain using control packets 226. The Connection Manager executes the following configuration tasks within a domain:

Enumeration of Routers
    Router initialization
    Scanning and setting Adapter configurations
    Setting and removing Paths
    Configuration of QoS behavior in the USB4 Fabric including flow control and bandwidth allocation.
    Management across Domains Further details for implementing a USB Connection Manager are provided in the USB4 Connection Manager (CM) Guide (current draft version Revision 0.7, December 2018).

Exemplary Host Platform Architectures

Figure 3A:
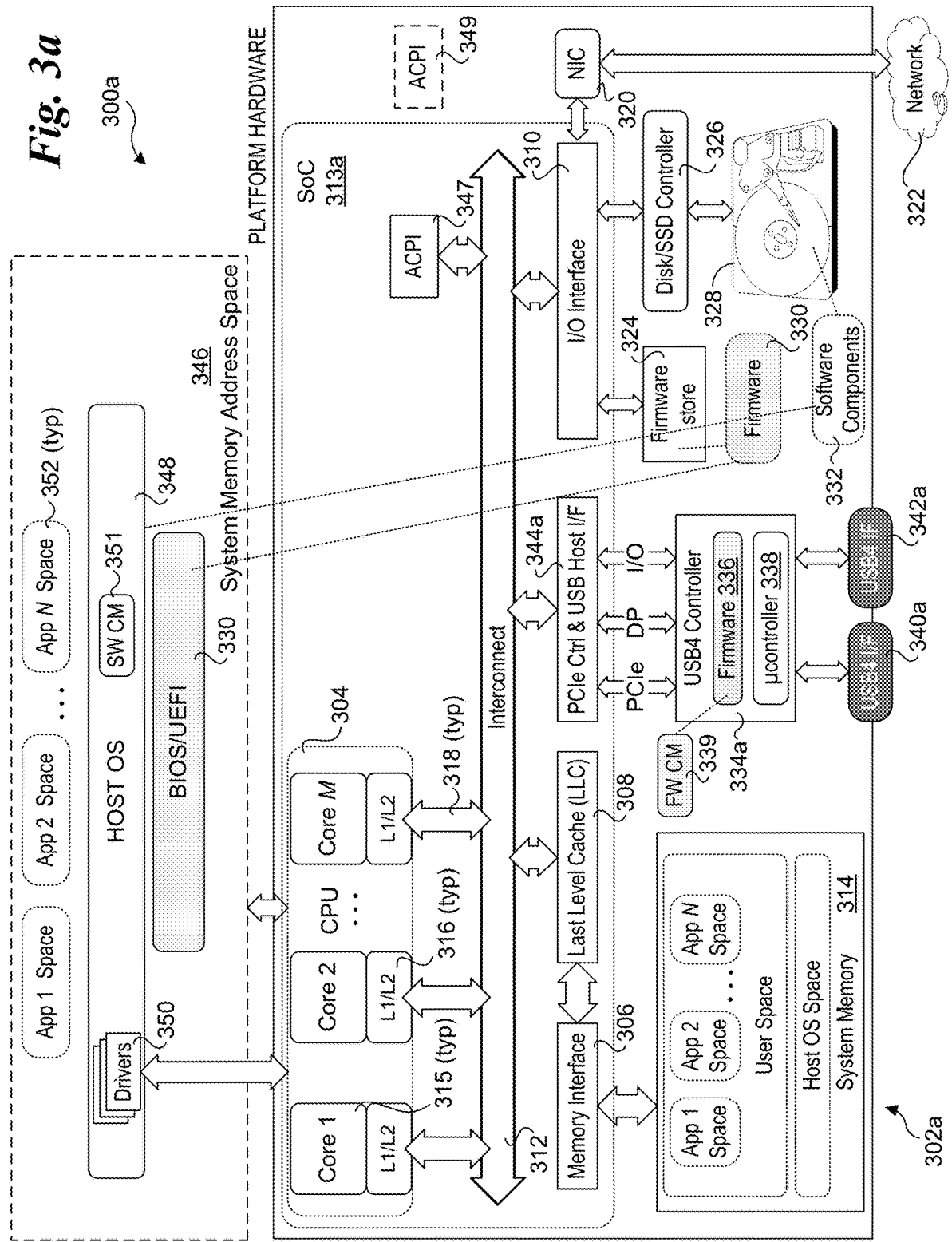
FIG. 3a is a schematic diagram of a first exemplary host platform architecture under which a USB4 controller is implemented in a discrete component, according to one embodiment.
Figure 3B:
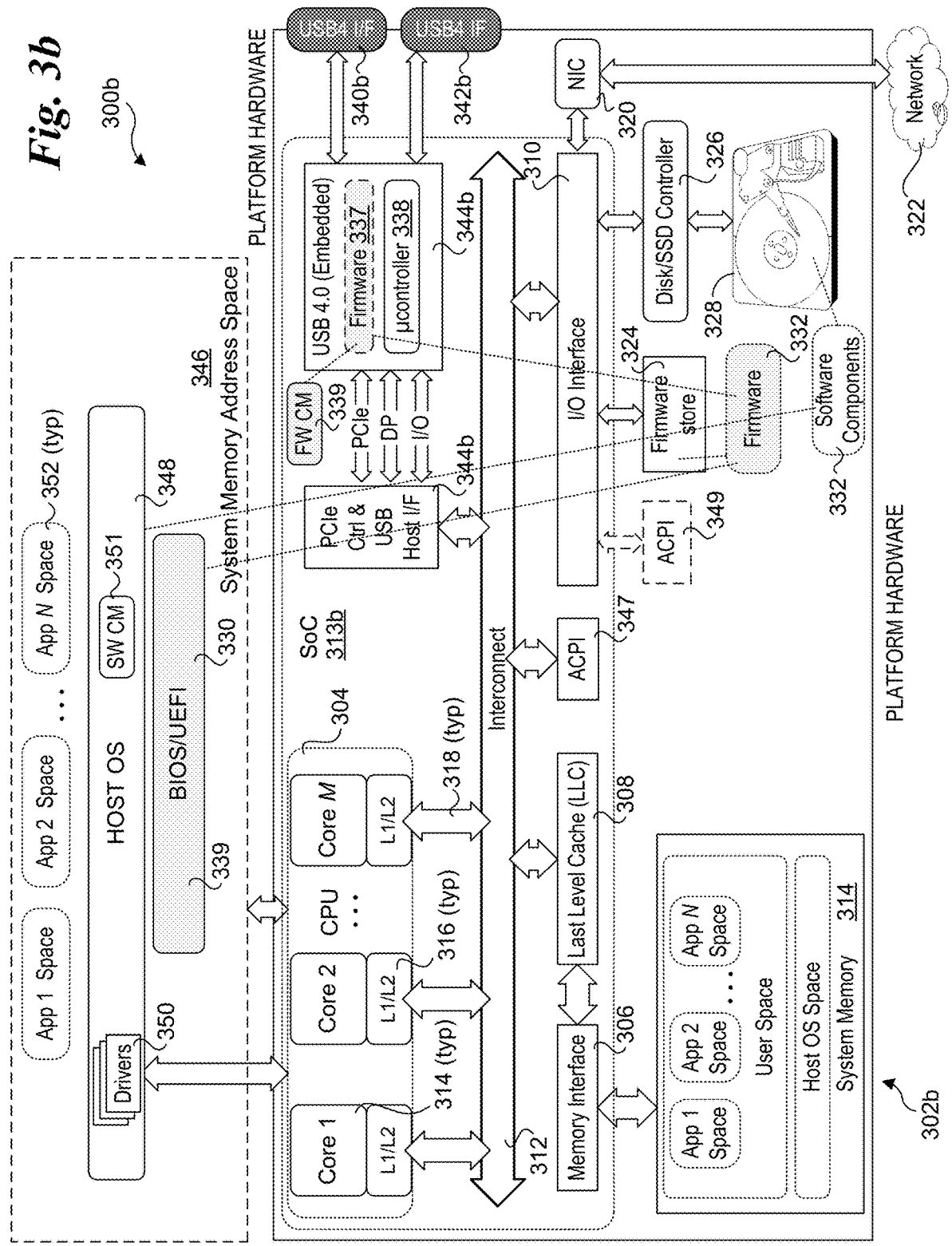
FIG. 3b is a schematic diagram of a second exemplary host platform architecture under which a USB4 controller is implemented in an embedded USB4 controller block on an SoC, according to one embodiment.

To provide better understanding of how embodiments of automatic switching and deployment of software- or firmware-based USB4 connection managers may be implemented, examples of host platform architectures 300a and 300b are presented in FIGS. 3a and 3b. It will be understood by those having skill in the art that host platform architectures 300a and 300b are merely examples of systems and devices under which aspects of the embodiments disclosed herein may be implemented and are non-limiting.

FIG. 3a shows a host platform architecture 300a including platform hardware 302a and various firmware and software-based components. Platform hardware 302a includes a central processing unit (CPU) 304 coupled to a memory interface 306, a last level cache (LLC) 308 and an input/output (I/O) interface 310 via an interconnect 312. In some embodiments, all or a portion of the foregoing components may be integrated on a System on a Chip (SoC), as depicted by SoC 313a. Memory interface 306 is configured to facilitate access to system memory 314, which will usually be separate from the SoC (such as DDR4 DIMMs, NVDIMMs, etc.).

CPU 304 includes a core portion including M processor cores 315, each including a local level 1 (L1) and level 2 (L2) cache 316. Optionally, the L2 cache may be referred to as a "middle-level cache" (MLC). As illustrated, each processor core 314 has a respective connection 318 to interconnect 312 and operates independently from the other processor cores.

For simplicity, interconnect 312 is shown as a single double-ended arrow representing a single interconnect structure; however, in practice, interconnect 312 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, toroid, or mesh interconnect structures.

I/O interface 310 is illustrative of various I/O interfaces provided by platform hardware 302a. Generally, I/O interface 310 may be implemented as a discrete component (such as an ICH (I/O controller hub) or the like), or it may be integrated on an SoC. Moreover, I/O interface 310 may also be implemented as an I/O hierarchy, such as a Peripheral Component Interconnect Express (PCIe™) I/O hierarchy. I/O interface 310 further facilitates communication between various I/O resources and devices and other platform components. These include a Network Interface Controller (NIC) 320 that is configured to facilitate access to a network 322, and various other I/O devices, which include a firmware store 324, a disk/SSD controller 326, and a disk drive 328. More generally, disk drive 328 is representative of various types of non-volatile storage devices, including both magnetic- and optical-based storage devices, as well as solid-state storage devices, such as solid state drives (SSDs) or Flash memory. Firmware store 324 is used to store firmware 332. Firmware for a host platform such as computer system is sometimes referred to as BIOS (Basic Input Output System). Under one embodiment, firmware 332 comprises Universal Extensible Firmware Interface (UEFI) firmware.

Platform architecture 300a further includes a discrete USB4 controller 334a configured to implement USB4 operations described herein and/or otherwise is configured to perform various operations in accordance with the USB 4.0 Specification. USB4 controller 334a may generally comprise an integrated circuit in the form of a chip or module. In one embodiment, firmware 336 including an FW CM 339 is stored in USB4 controller 334a and is executed on one or more processing elements, such as depicted by a microcontroller 338. More generally, the USB4 functionality described herein may be implemented using various types of embedded logic, including but not limited to firmware executed on one or more processing elements, an embedded application specific integrated circuit (ASIC), or pre-programmed or programmable logic implemented using a Field Programmable Gate Array (FPGA) or the like. Other types of embedded logic, such as a digital signal processor (DSP), may also be used. It is further noted that electrical layer 216 will usually be implemented in predefined circuitry. In the example configuration of host platform architecture 300a, USB4 controller 334a includes a pair of USB4 ports (not shown) that are connected to respective downstream USB interfaces 340a and 342a.

USB4 controller 334a is configured to communicate with software and/or firmware running on platform hardware 302a via applicable I/O interface circuitry that is collectively illustrated as a PCIe controller and USB host interface 344a that is implemented on an SoC 313b and is coupled to interconnect 312. As described above, inclusion of a PCIe controller (e.g., PCIe controller 110 in FIG. 1) is optional. In addition, PCIe controller and USB host interface 344a may comprises a portion of the SoC interconnect hierarchy (collectively illustrated by I/O interface 310) and are illustrated as a separate block for illustrative purposes.

The multiple cores 314 of CPU 304 are configured to load firmware 330 and various software components 332 into one or more address spaces in a system memory address space 346 and execute the firmware and software components. Generally, software components 332 will include components associated with a host operating system (OS) 348, along with various modules and applications. All or a portion of software components 332 may be stored in one or more non-volatile storage devices, such as depicted by disk drive 328. Optionally, all or a portion of software components 332 may be stored on one or more storage devices (not shown) that are accessed via network 322.

During boot up or run-time operations, various software components 330 and firmware 332 are loaded into system memory 314 and executed on cores 314 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Figure 11:
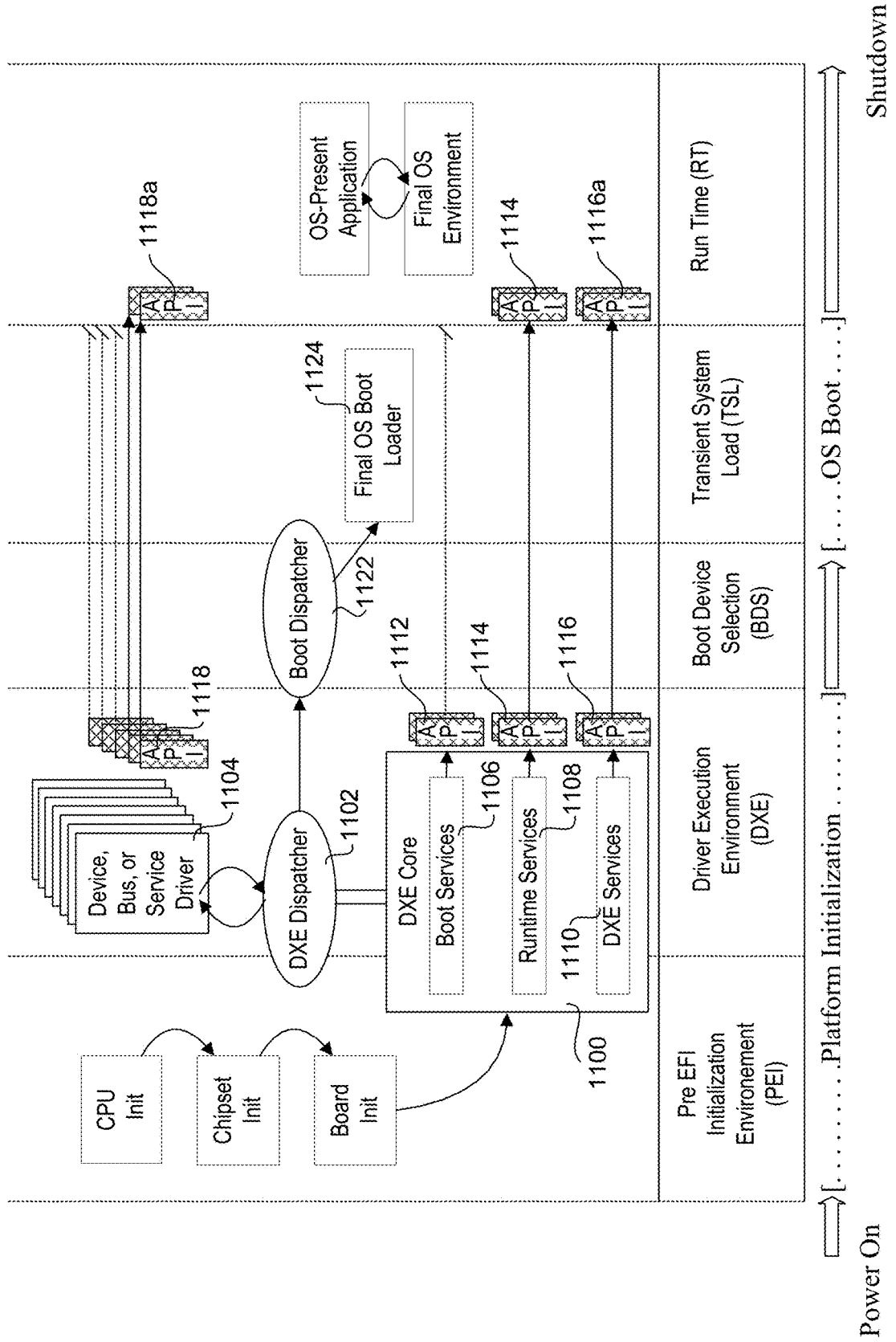
FIG. 11 is a schematic diagram illustrating the various execution phases that are performed in accordance with the Universal Extensible Firmware Interface (UEFI) framework.

Under a normal system boot for platform hardware 302, firmware 330 will be loaded and configured in system memory 314, followed by booting host OS 348. Under UEFI, this involves a multi-phase process as illustrated in FIG. 11 and described below. Host OS 348 includes kernel components implemented in a kernel space, and various other components that are implemented in user space. Host OS 348 also includes various drivers 350, including USB-related drivers, which may be implemented in kernel space and/or user space. Applications, as depicted by "App 1, App 2 . . . App N, are implemented in their own application spaces 352 in user space.

As discussed above, in some embodiments a flag such as_OSC bit may be used to indicate operating system support for a software-based CM and provide a two-way handshake between BIOS and the OS. The _OSC bit may be implemented using the ACPI_OSC method, which is used to communicate which of the features or capabilities that are available in the platform can be controlled by the operating system. The _OSC method is defined in the Advanced Configuration and Power Interface (ACPI) Specification, Revision 4.0, which is an industry specification for the efficient handling of power consumption in desktop and mobile computers. ACPI specifies how a computer's BIOS, operating system, and peripheral devices communicate with each other about power usage.

Generally, ACPI functionality may be implemented via an embedded ACPI block on an SoC or using a separate (from the SoC) off-chip component. In FIGS. 3a and 3b these are depicted as an on-chip ACPI block 347 and an off-chip ACPI block 349. It is noted that when implemented in a separate component (e.g., semiconductor chip), the ACPI block/functionality may generally be combined with other block and functions in a chip that supports multiple functions (in addition to ACPI functions). As illustrated in FIG. 3b, such an off-chip component may be communicatively coupled to SoC 313 via I/O interface 310 or otherwise may be communicatively coupled via an applicable I/O interface.

Under host platform architecture 300b of FIG. 3b, platform hardware 302b includes an SoC 313b with an embedded USB 4.0 host block 334b including a microcontroller 338 that is configured to execute firmware 337. The functionality of embedded USB 4.0 host block 334b is similar to the functionality for discrete USB4 controller 334a, except the corresponding circuitry/embedded logic is implemented on SoC 313b rather than on a separate component. In one embodiment, firmware 337 is loaded into memory (not shown) accessible to microcontroller 338 during pre-boot operations; optionally, all or a portion of firmware 337 may be stored in embedded USB 4.0 host block 334b. Embedded USB 4.0 host block 334b includes a pair of USB ports (not shown) connected to respective downstream USB4 interfaces 340b and 342b and is connected to interconnect 312 via a PCIe controller and USB hosts interface 344b. As before, inclusion of a PCIe controller is optional, and PCIe controller and USB hosts interface 344b may comprises a portion of the SoC interconnect hierarchy and are illustrated as a separate block for illustrative purposes.

Both of host platform architecture 300a and host platform architecture 300a will generally include additional components that are not shown for simplicity, such as a power supply and power conditioning circuitry, additional peripheral devices, system management components (such as a management engine implemented in SoC 313a or 314b), etc. Moreover, the embodiments disclosed herein may be implemented on other types of platforms having different architectures, including but not limited to computers, laptops, notebooks, mobile phones, tablets, Chromebooks, etc.

Figure 3C:
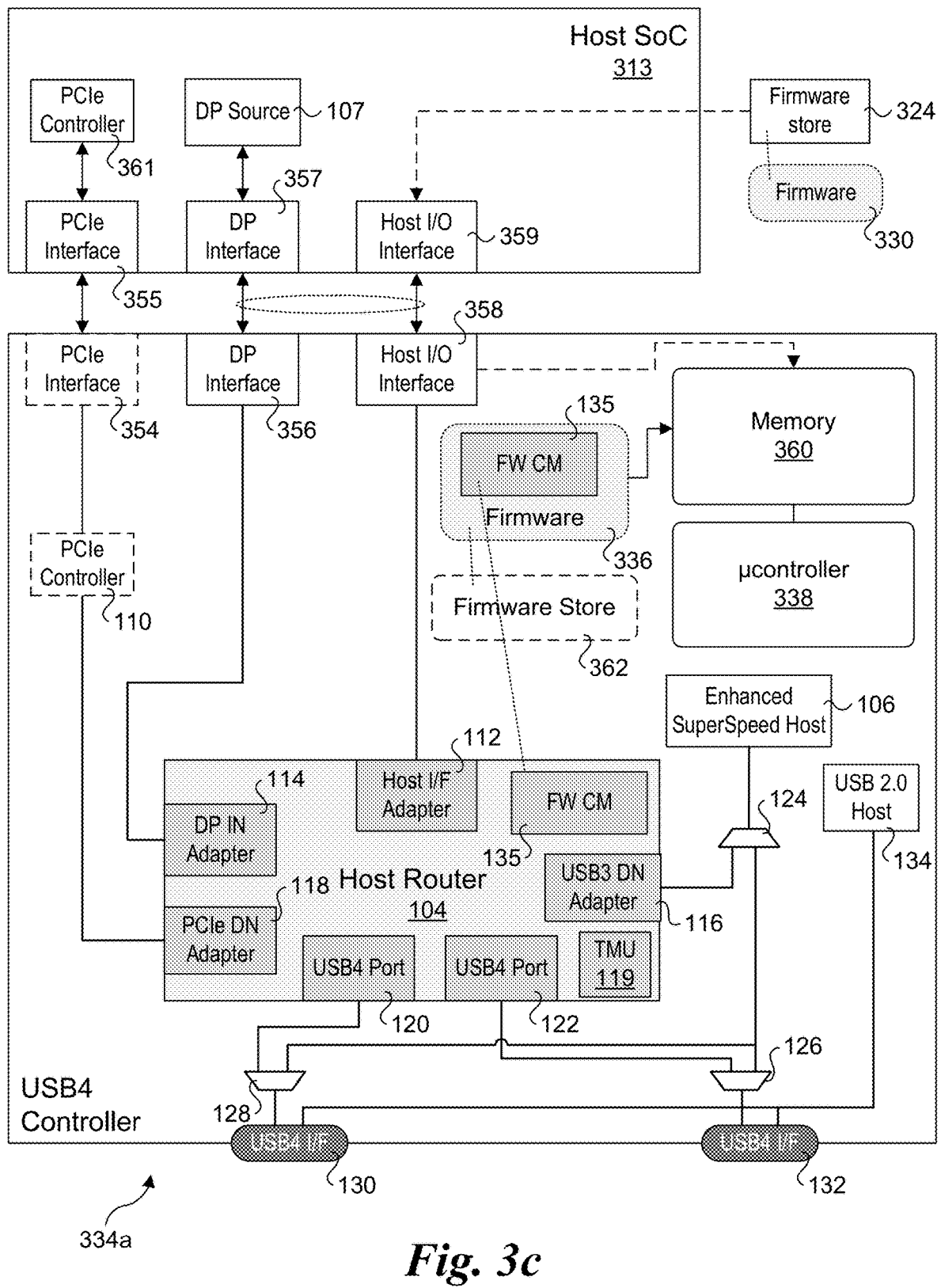
FIG. 3c is a schematic diagram illustrating further details of the discrete USB4 controller of FIG. 3a, according to one embodiment.

FIG. 3c shows further details of USB4 controller 334a, according to one embodiment. As depicted by like numbered blocks and circuitry in FIGS. 1 and 3c, USB4 controller 334a includes a core block of embedded circuitry and logic to implement selected functionality and USB4 interfaces of a USB4 host 100. As shown in the embodiment of FIG. 3c, USB4 controller 334a includes a PCIe interface 354 (optional), a DisplayPort interface 356, and a host I/O interface 358 that are respectively coupled to a PCIe interface 355, a Display Port interface 357, and a host I/O interface 359 on SoC 313. On USB4 controller 334a, PCIe interface 354 is coupled to a PCIe controller 110, which in turn is coupled to a PCIe DN adapter 118, Display Port interface 356 is coupled to DisplayPort input adapter 114 and host I/O interface 358 is coupled to host interface adapter 112. On SoC 313, PCIe interface 355 is coupled to a PCIe controller 361, while DP interface 357 is coupled to a DP source 108. In some embodiments, PCIe controller 361 and PCIe interface 355 are integrated in a PCIe root port.

In addition to the illustrated interfaces, a USB4 controller 334a and a USB 4.0 host block 334b will share a similar core block of embedded circuitry and logic for implementing USB 4.0 host functionality. This core block will generally include one or more processor elements, such as microcontroller 338, and memory 360. It is noted that microcontrollers will generally include registers and the like, and may include memory; however, for illustrative purposes, memory 360 is shown separate from microcontroller 338. During operation, selective components of firmware 336, including a FM connection manager 135 will be loaded into memory 360 and executed on one or more processor elements, such as microcontroller 338. All or a portion of firmware 336 may be stored in an optional non-volatile (NV) firmware store 362, such as embedded Flash memory or other type of NV memory. Optionally, all or a portion of firmware 336 may be stored in firmware store 324 as part of firmware 330 and loaded into memory 360 via host I/O interfaces 358 and 359 during platform boot operations.

When implemented in a discrete component such as a semiconductor chip, the upward-facing I/O interfaces (PCIe interface 354, DisplayPort interface 356, and host I/O interface 358) of USB4 controller 334a are external interfaces. These external I/O interfaces generally will be coupled to a host semiconductor chip, such as SoC 313, via line traces in a circuit board to which both the host SoC and USB4 controller chips are mounted. When similar USB4 controller functionality is implemented in an embedded USB4 controller block (e.g., USB4 controller block 334b) on an SoC (e.g., SoC 313), the PCIe, DisplayPort, and host I/O interfaces will be internal interfaces. Moreover, in some embodiments two or more of the PCIe, DisplayPort, and host I/O interface may be implemented in a composite interface when implemented in a discrete component or embedded block.

Automatic Switching Between Software and Firmware Connection Managers

The following embodiments disclose aspects of methods, apparatus, and software/firmware for implementing automatic switching between software and firmware Connection Managers. Under one aspect, a handshake mechanism is defined between BIOS (e.g., UEFI) and the operating system to discover supported CM capability and dynamically switch from a hardware CM to a software CM or vice versa if there is a mismatch. In addition, a mechanism is defined to deploy the correct driver based on a class code, two-part or four-part identifier (ID).

In one embodiment a new platform wide Operating Systems Capabilities (_OSC) bit (part of the ACPI Specification) is defined to indicate operating system support for a software-based CM and provide a two-way handshake between BIOS and the OS. Optionally, other handshake mechanisms may be employed, such as using "OsIndications" and "OsIndicationsSupported" EFI variables (as part of an UEFI firmware implementation).

The BIOS will use either the firmware- or software-based Connection Manager based on the previous (most recent) CM setting. In one embodiment, platform firmware is used to access a non-volatile storage mechanism where settings for platform variables are kept. There are four possible configuration settings:

Software CM Dynamic: Use Software CM in Platform firmware and OS (if supported). If not supported in OS, revert to FW CM Software CM Static: Use only Software CM in platform firmware and OS. If OS SW CM support is unavailable, USB4 will not be functional in the OS.

Firmware CM Dynamic: Use Firmware CM in platform firmware and OS (if SW CM is not supported). This is typically triggered on a OS downgrade from an OS supporting SW CM to an OS that does not support SW CM.

Firmware CM Static: Use Firmware CM in platform firmware and OS. If OS requests native SW CM support, deny OS request.

When the platform boots, the setting for software versus firmware CM will be read and applied to the USB4 host router and platform firmware, either engaging the FW CM and not loading the SW CM, or vice versa. Booting of the OS will then continue to complete booting of the platform.

After_OSC bit evaluation, and if necessary, a switch to the appropriate FW or SW CM will be automatically performed, along with updating applicable UEFI settings. During the operating system boot sequence, the firmware-provide_OSC method is invoked by the OS. If the value for native OS control for USB 4 passed in via the _OSC bit matches the platform firmware setting, the platform firmware accepts the setting. If the value for native OS control for USB 4 passed in via _OSC does not match the platform firmware setting, platform firmware:

1) If the platform firmware setting is static, do not change configuration; if the OS requests native control, do not grant it.
2) If the platform firmware setting is dynamic:
   a. Update the platform variable setting to match the new setting—either SW CM Dynamic or FW CM Dynamic;
   b. Reconfigure the USB4 host router to match the new configuration
   c. (Possibly) wait for host router configuration change and initialization to complete.

Following the foregoing operations, the OS will continue to boot through completion. During subsequent runtime operations, USB4 Connection Manager operations will be implemented via the SW CM or the FW CM, as applicable.

Figure 4:
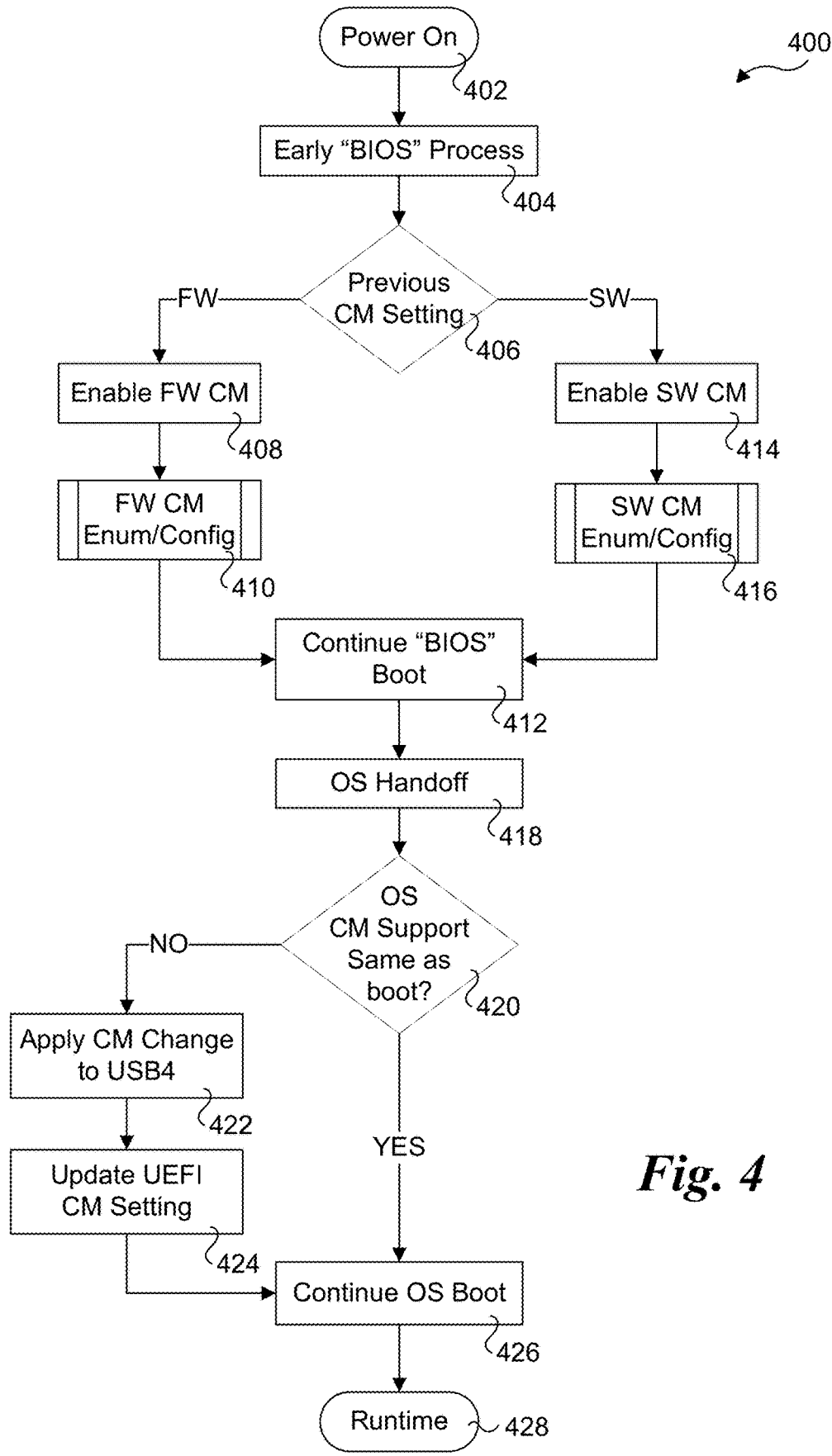
FIG. 4 is a flowchart illustrating operations and logic for implementing automatic switching between software (SW) and firmware (FW) Connection Managers (CMs), according to one embodiment.

FIG. 4 shows a flowchart 400 illustrating operations and logic for implementing automatic switching between software and firmware Connection Managers, according to one embodiment. The process begins with a power on event in a start block 402. In response, an early BIOS process is initiated and executed, as depicted in a block 404.

In a decision block 406 a determination is made to whether the previous CM setting is a FW CM or a SW CM, wherein "previous" corresponds to the most recent CM setting. As discussed above, the previous CM setting may be stored and accessed via firmware. As shown by the left-hand branch, if the previous CM setting was FW CM, the FW CM is enabled in a block 408 and FW CM enumeration and configuration processes are performed in a process block 410. Continuation of the BIOS boot process is then performed, as depicted in a block 412.

As shown by the right-hand branch, if the previous CM setting was SW CM, the SW CM is enabled in a block 414 and SW CM enumeration and configuration processes are performed in a process block 416. Continuation of the BIOS boot process is then performed in block 412.

In a block 418, the BIOS boot process is handed off to an operating system boot process. In a decision block 420 a determination is made by the OS to determine whether it supports the same CM configuration is used by the BIOS boot processes described above. If it does, the logic proceeds to continue the OS boot process in a block 426. Upon completion of the OS boot process, runtime operations are performed on the platform via execution of various software, as depicted by a runtime end block 428. If the answer to decision block 420 is NO, the logic proceeds to a block 422 in which the CM change is applied to the USB4 configuration, and the UEFI CM setting is updated to reflect the change in a block 424. The logic then proceeds to block 426 to continue the OS boot process.

Mechanism to Switch CM Mode in Hardware

Figure 5:
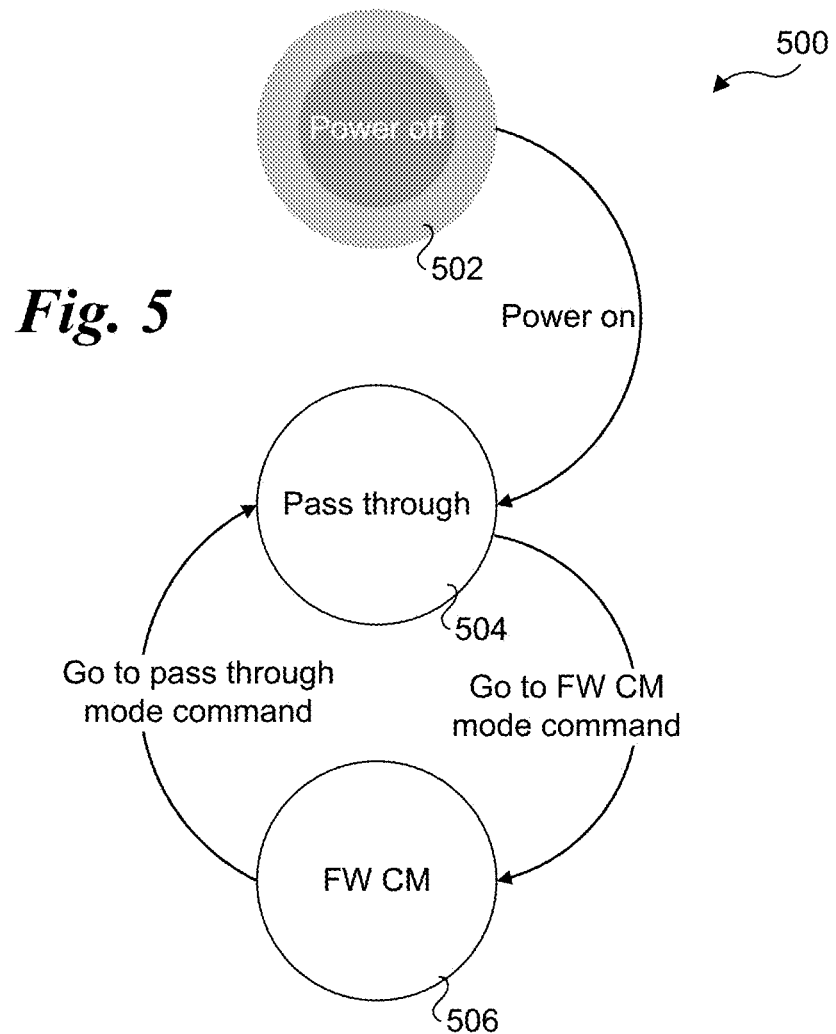
FIG. 5 is a state/flowchart diagram illustrating pass through and FW CM states.
Figure 6:
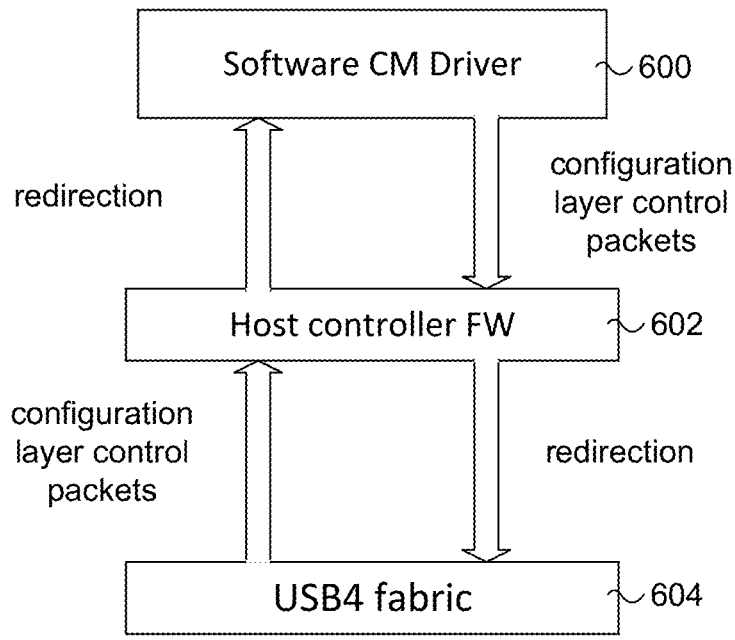
FIG. 6 is a diagram illustrating message flows between a software CM driver, USB4 controller firmware, and a USB4 fabric when operating in a pass-through operational mode, according to one embodiment.

In one embodiment, USB4 controllers are configured to support two operational modes including 1) a "pass through mode" and 2) a "FW CM mode." As shown in a state diagram 500 in FIG. 5, in one embodiment the USB4 controller starts in "pass through mode" (pass-through state 504) while coming out of reset (in response to a power on event from a power off state 502). As shown in FIG. 6, while in "pass through" operational mode, the host controller firmware 602 redirects incoming configuration layer control packets received from host-side software CM driver 600 into USB4.0 configuration layer control packets routing logic to USB4 fabric 604. Similarly, incoming configuration layer control packets from the USB4 fabric 604 are redirected by host controller FW 602 to SW CM driver 600.

Figure 7:
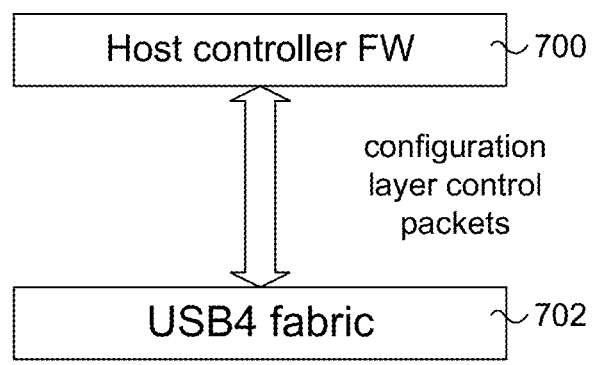
FIG. 7 is a diagram illustrating message flows between USB4 controller firmware and a USB4 fabric when operating in a FW CM operational mode, according to one embodiment.

As shown in FIG. 7, while in "FW CM mode" the host controller firmware 700 activates embedded firmware-based CM logic. Configuration layer control packets originated by the USB4.0 fabric 702 are consumed and handled by a controller-embedded FW CM (e.g., FW CM 339 in FIGS. 3a and 3b).

As shown in state diagram 500, the operational mode can be dynamically switched between pass-through mode (pass-through state 504) and FW CM mode (FW CM state 506). In one embodiment, a PCIe configuration space-based mailbox allows the control system SW to be dynamically switched between these operational modes. This dynamic switch mechanism support switching between the operational modes without require reset of the USB4 controller, thus avoiding delays during the system boot sequence.

While switching from "pass through mode" to "FW CM mode," the host controller FW checks the USB4 controller configuration state. If the USB4 controller is uninitialized the SW-based CM was inactive prior to dispatch of the switching command, and the FW CM logic will be activated. If USB4 controller is initialized the SW-based CM was active prior to dispatch of the switching command. In this case, the host controller FW will reset the USB4 topology by resetting the USB4 downstream links. The host controller will also ensure the USB4 controller configuration is valid, to avoid resetting the host controller hardware. While switching from "FW CM mode" to "pass through mode" the host controller FW will simply activate packet redirection logic.

Deploying the Correct Driver Based on CM Configuration

Irrespective of the CM configuration, the hardware (i.e. the Native host interface of the USB4 controller) will present itself in a similar manner. Specifically, it's Device ID, Vendor ID, Subsystem Device ID, Subsystem Vendor ID and class code continue to be the same. However, this makes it difficult to load the correct driver corresponding to the currently configured CM mode.

The following three parameters are available for effecting the correct driver configuration:
FW CM: Using current FW CM driver
$3^{rd}$ Party SW CM: Using software-based CM driver by a $3^{rd}$ Party (e.g., manufacturer of USB4 or SoC with embedded USB4 host block)
Native operating system SW CM: Inbox software-based CM driver developed by OS vendor (e.g., Microsoft for Windows Operating system or various Linux vendors for Linux-based OS)

Under one embodiment, configuration of the correct driver based on CM configuration is implemented using the following examples, which are implemented for a Microsoft Windows-based OS. One of skill in the art will recognize that similar approaches may be used for other operating systems, such as Linux-based operating system, using an driver ID scheme that used by that operating system.

Under Windows operating system, the OS prioritizes drivers in the following order:
1) 4-part ID targeted driver
2) 2-part ID targeted driver over
3) Class code targeted driver A 4-part ID consists of a Device ID (DID), a Vendor ID (VID), a Subsystem Device ID (SDID), and a Subsystem Vendor ID (SID). A 2-part ID consists of a Device ID and Vendor ID. The class code is used to tell system software about the type (class) of a device, such as USB 4.0, and does not specify a Device ID nor Vendor ID.

Figure 8:
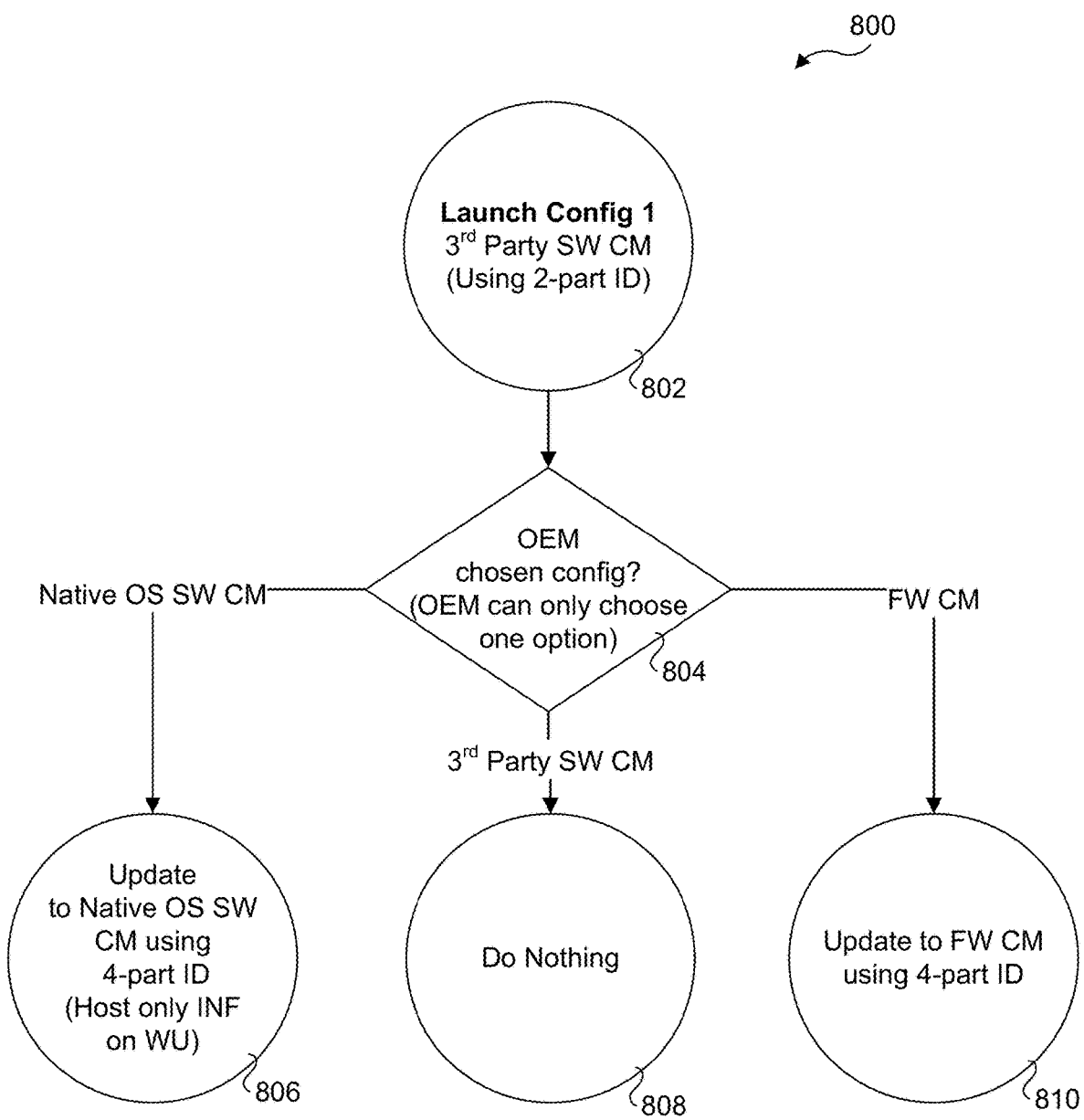
FIG. 8 is a flowchart/state diagram corresponding to a first launch configuration under which a platform will host a $3^{rd}$ party SW CM driver using a 2-part ID on a Windows Update, according to one embodiment.

FIG. 8 shows a flowchart/state diagram 800 corresponding to a first launch configuration under which a platform will host a $3^{rd}$ party SW CM driver using a 2-part ID on a Windows Update (WU). In a decision block 804, the OEM (original equipment manufacturer) of the platform choses a configuration: Native OS SW CM, $3^{rd}$ party SW CM, or FW CM. If the OEM choses the Native OS SW CM driver, the CM driver configuration will be updated to the Native OS SW CM driver using the 4-part ID, as shown in a state 806. For example, this will be performed via a Windows Update. If the OEM chooses the $3^{rd}$ party SW CM option, the CM driver configuration is not changed, as shown is a state 808. If the OEM chooses the FW CM option, the CM driver configuration will be updated to the FW CM driver using a 4-part ID, as shown in a state 810.

Figure 9:
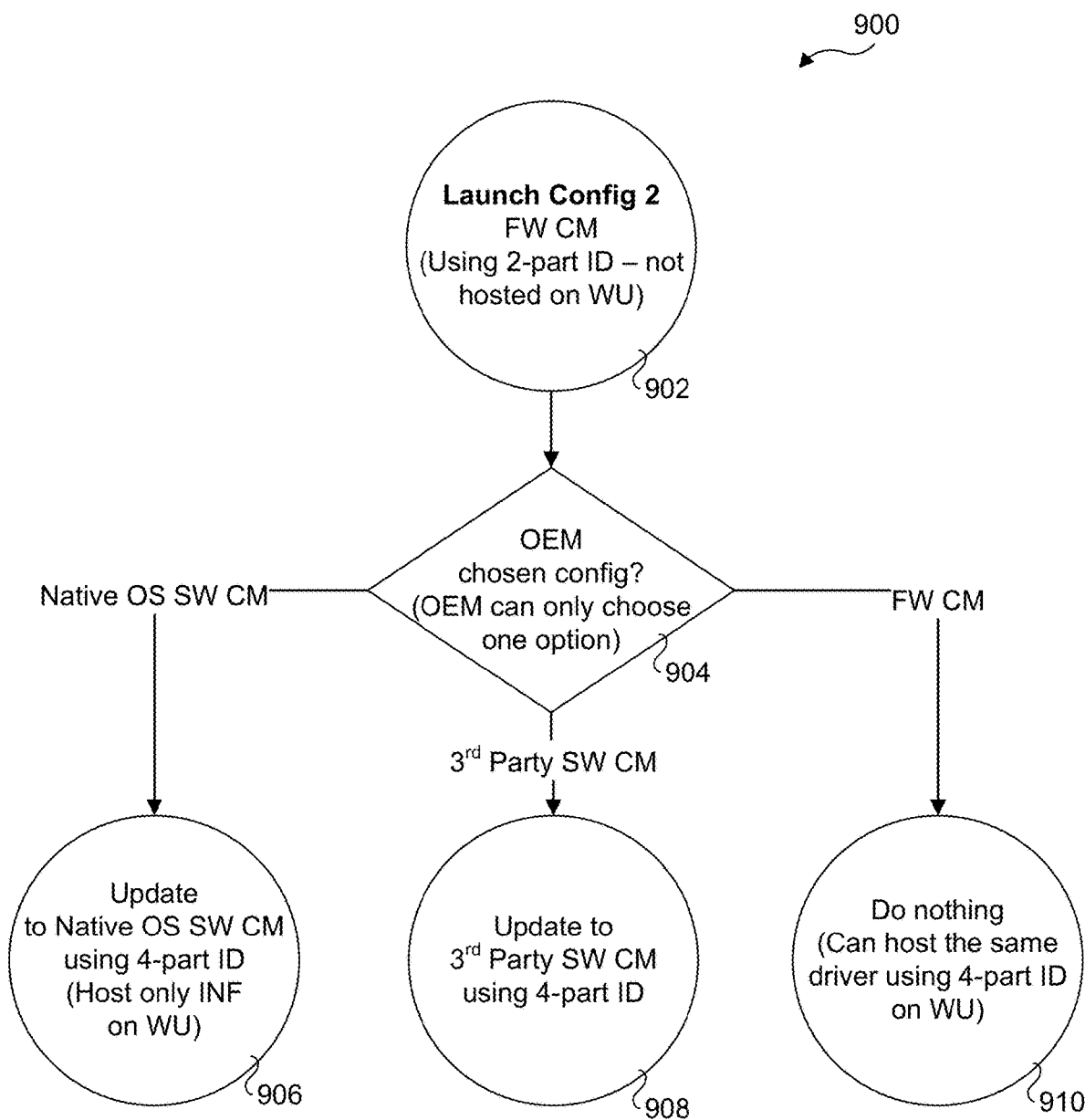
FIG. 9 is a flowchart/state diagram corresponding to a second launch configuration under which an OS will load a native OS SW CM driver based on Class code according to one embodiment.

FIG. 9 shows a flowchart/state diagram 900 corresponding to a second launch configuration under which an OS will load a native OS SW CM driver based on Class code. In a decision block 904, the OEM of the platform choses one of the Native OS SW CM driver, the $3^{rd}$ party SW CM driver, or the FW CM driver. If the OEM choses the Native OS SW CM driver, the CM driver configuration will be updated to the Native OS SW CM driver using the 4-part ID, as shown in a state 906. If the OEM chooses the $3^{rd}$ party SW CM driver option, the CM driver configuration is updated to the $3^{rd}$ party SW CM driver using a 4-part ID, as shown is a state 908. If the OEM chooses the FW CM driver option, the CM driver configuration is not changed, as shown in a state 910. The same (current) FW CM driver may be used using a 4-part ID on a Windows Update.

Figure 10:
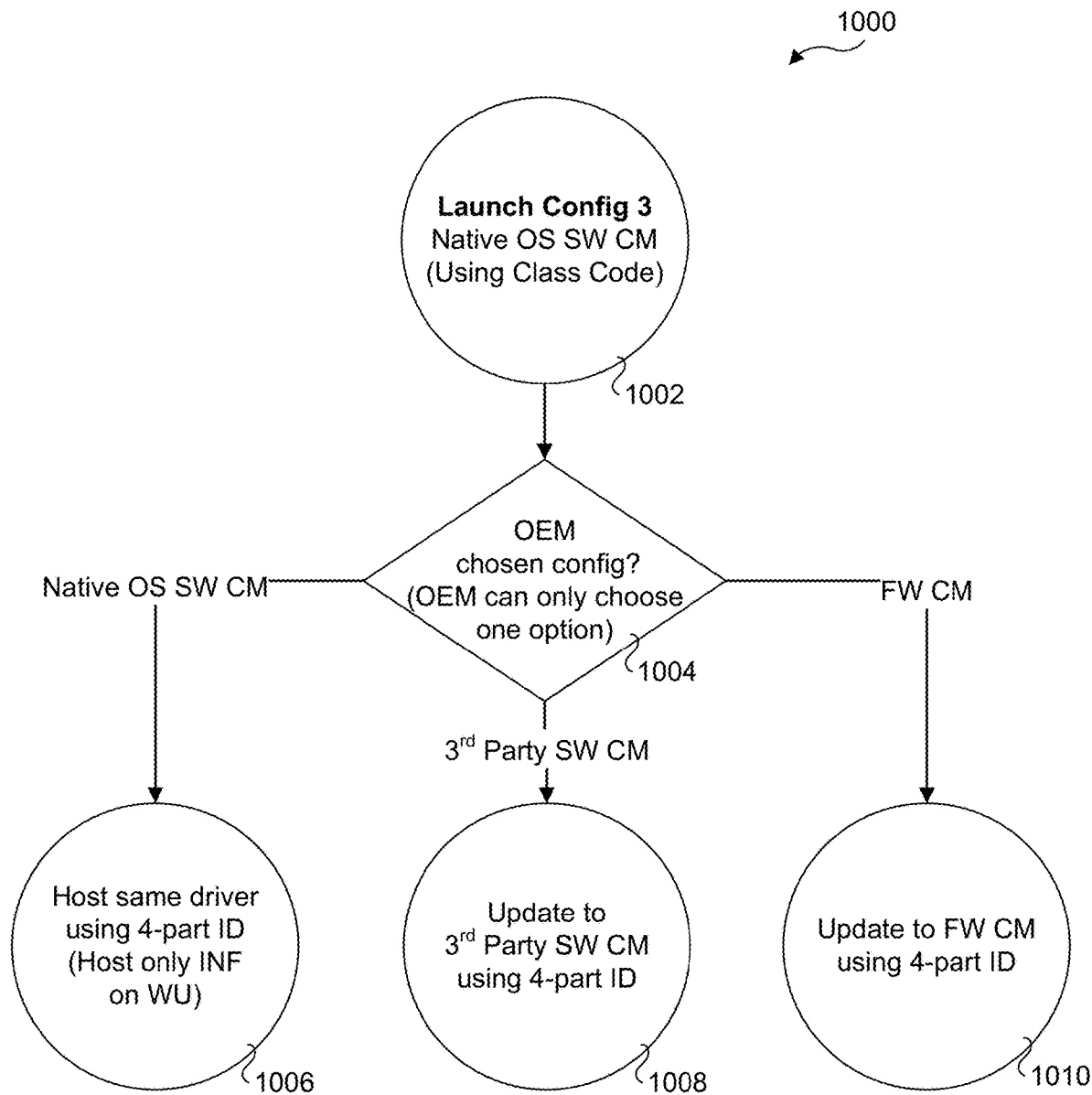
FIG. 10 is a flowchart/state diagram corresponding to a third launch configuration under which an OEM will override a native OS SW CM driver based on Class code to either a native OS SW CM driver, a $3^{rd}$ party SW CM driver, or FW CM driver based on a 4-part ID, according to one embodiment.

FIG. 10 shows a flowchart/state diagram 1000 corresponding to a third launch configuration under which an OEM will override a native OS SW CM driver based on Class code to either a native OS SW CM driver, a $3^{rd}$ party SW CM driver, or FW CM driver based on 4-part ID. As before, in a decision block 1004, the OEM of the platform choses the Native OS SW CM driver, the $3^{rd}$ party SW CM driver, or the FW CM driver. If the OEM choses the Native OS SW CM driver, the same Native OS SW CM driver will be used with the CM driver configuration being updated to replace the Class code with a 4-part ID, as shown in a state 1006. If the OEM chooses the $3^{rd}$ party SW CM driver option, the CM driver configuration is updated to the $3^{rd}$ party SW CM driver using a 4-part ID, as shown is a state 1008. If the OEM chooses the FW CM driver option, the CM driver configuration will be updated to the FW CM driver using a 4-part ID, as shown in a state 810.

Exemplary UEFI Firmware Embodiments

In some embodiments, the firmware that is referred to as "BIOS" in the preceding discussion comprises UEFI firmware components and corresponding executable instructions. UEFI is a public industry specification (current version UEFI Specification Version 2.8, March 2019) that describes an abstract programmatic interface between platform firmware and shrink-wrap operation systems or other custom application environments. The UEFI specification also includes a Platform Initialization (PI) Specification (current version 1.7, January 2019). The UEFI framework include provisions for extending BIOS functionality beyond that which was historically provided by the BIOS code stored in a platform's BIOS device (e.g., flash memory). More particularly, UEFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

FIG. 11 shows an event sequence/architecture diagram used to illustrate operations performed by a platform under the framework in response to a cold boot (e.g., a power off/on reset). The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. An optional Security Phase (not shown) may be implemented before the PEI phase. The phases build upon one another to provide an appropriate run-time environment for the OS and platform.

The PEI phase provides a standardized method of loading and invoking specific initial configuration routines for the processor (CPU), chipset, and motherboard. The PEI phase is responsible for initializing enough of the system to provide a stable base for the follow-on phases. Initialization of the platforms core components, including the CPU, chipset and main board (i.e., motherboard) is performed during the PEI phase. This phase is also referred to as the "early initialization" phase. Typical operations performed during this phase include the POST (power-on self-test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 1100, the DXE dispatcher 1102, and a set of DXE drivers 1104.

The DXE core 1100 produces a set of Boot Services 1106, Runtime Services 1108, and DXE Services 1110. The DXE dispatcher 1102 is responsible for discovering and executing DXE drivers 1104 in the correct order. The DXE drivers 1104 are responsible for initializing the processor, chipset, and platform components as well as providing software abstractions for console and boot devices. These components work together to initialize the platform and provide the services required to boot an operating system. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard-coded addresses. This means that the DXE core can be loaded anywhere in physical memory, and it can function correctly no matter where physical memory or where Firmware segments are located in the processor's physical address space. Third, the DXE core does not contain any CPU-specific, chipset specific, or platform specific information. Instead, the DXE core is abstracted from the system hardware through a set of architectural protocol interfaces. These architectural protocol interfaces are produced by DXE drivers 1104, which are invoked by DXE Dispatcher 1102.

Figure 12:
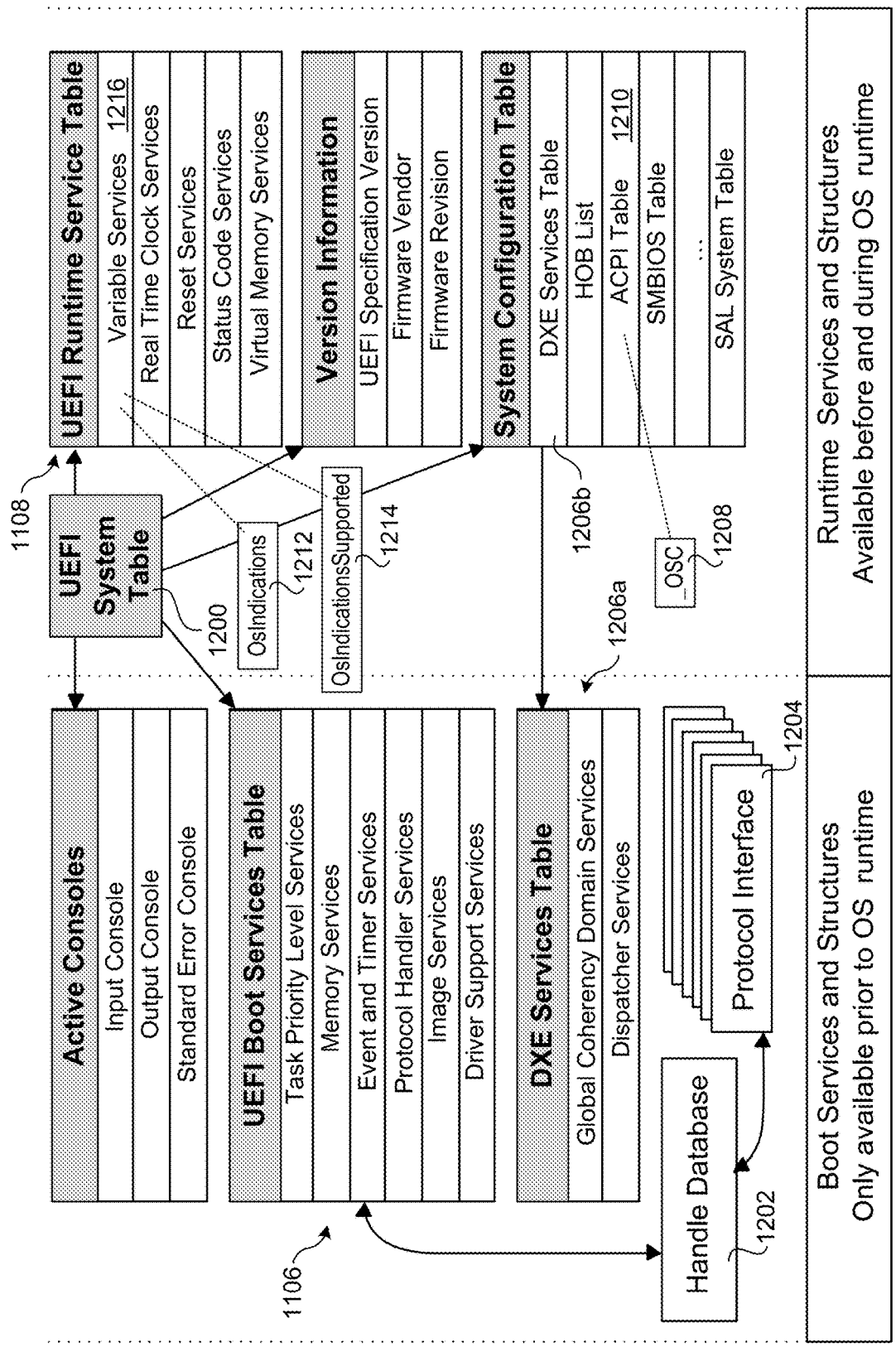
FIG. 12 is a block schematic diagram illustrating various components of a UEFI system table that is used to enable an operating system to access UEFI components during OS runtime operations.

The DXE core produces an EFI System Table 1200 and its associated set of Boot Services 1106 and Runtime Services 1108, as shown in FIG. 12. The DXE Core also maintains a handle database 1202. The handle database comprises a list of one or more handles, wherein a handle is a list of one or more unique protocol GUIDs (Globally Unique Identifiers) that map to respective protocols 1204. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

In contrast to Boot Services, Runtime Services are available both during pre-boot and OS runtime operations. One of the Runtime Services that is leveraged by embodiments disclosed herein is the Variable Services. As described in further detail below, the Variable Services provide services to lookup, add, and remove environmental variables from both volatile and non-volatile storage. As used herein, the Variable Services is termed "generic" since it is independent of any system component for which firmware is updated by embodiments of the invention.

The DXE Services Table includes data corresponding to a first set of DXE services 1206*a* that are available during pre-boot only, and a second set of DXE services 1206*b* that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 1106, Runtime Services 1108, and DXE services 1110 are accessed via respective sets of APIs 1112, 1114, and 1116. The APIs provide an abstracted interface that enables subsequently loaded components to leverage selected services provided by the DXE Core.

After DXE Core 1100 is initialized, control is handed to DXE Dispatcher 1102. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services.

The second class of DXE drivers are those that comply with the UEFI 2.0 Driver Model. These drivers do not perform any hardware initialization when they are executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the UEFI 2.0 Driver Model ultimately provide software abstractions for console devices and boot devices when they are explicitly asked to do so.

Any DXE driver may consume the Boot Services and Runtime Services to perform their functions. However, the early DXE drivers need to be aware that not all of these services may be available when they execute because all of the architectural protocols might not have been registered yet. DXE drivers must use dependency expressions to guarantee that the services and protocol interfaces they require are available before they are executed.

The DXE drivers that comply with the UEFI 2.0 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the InstallConfigurationTable function. These published drivers are depicted by API's 1118. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 1120 is used during the BDS phase to enable selection of a Boot target, e.g., an OS to be booted by the system.

During the TSL phase, a final OS Boot loader 1122 is run to load the selected OS. Once the OS has been loaded, there is no further need for the Boot Services 1106, and for many of the services provided in connection with DXE drivers 1104 via API's 1118, as well as DXE Services 1206a. Accordingly, these reduced sets of APIs that may be accessed during OS runtime are depicted as API's 116A, and 118A in FIG. 11.

In accordance with aspects of the invention, the pre-boot/boot framework of FIG. 11 may be implemented to enable update of various firmware, including system firmware (i.e., firmware stored on a motherboard firmware device or the like) and add-in firmware (e.g., firmware commonly associated with option ROMs). This is facilitated, in part, by API's published by respective components/devices during the DXE phase, and through use of the Variable Services runtime service.

As discussed above, in some embodiments an _OSC (Operating Systems Capabilities) bit may be used to indicate operating system support for a software-based CM and provide a two-way handshake between BIOS and the OS. As shown in FIG. 12, an _OSC bit 1208, which is associated with ACPI, may be stored in an ACPI Table 1210. Also as discussed above, either an "OsIndications" EFI variable 1212 or an "OsIndicationsSupported" EFI variable 1214 may be used in the two-way handshake between BIOS and the OS, either of which may be accessed via variable services 1216.

It will be recognized by those having skill in the art that other BIOS architectures other than UEFI may be used in a similar manner, and that the use of UEFI in the foregoing description and drawing figures is merely exemplary and non-limiting. In addition, it will also be understood that various aspects of the embodiments disclosed herein are also exemplary and non-limiting.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M' and 'N' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented by a host platform comprising a Universal Serial Bus 4 (USB4) controller and including a firmware-based (FW) USB4 configuration manager (CM) and a software-based (SW) USB4 CM, the method comprising:
    during a first platform boot process,
        booting a BIOS of the host platform;
        detecting a previous CM setting for the host platform and enabling the FW CM or SW CM based on the previous CM setting, the FW CM or SW CM that is enabled comprising a BIOS-enabled CM;
        performing an operating system (OS) handoff from BIOS to an OS boot process;
        determining if the OS supports use of the BIOS-enabled CM;
        when the OS does not support use of the BIOS-enabled CM,
            switching to a CM that is supported by the OS comprising one of the FW CM or SW CM, the CM that is switched to comprising an OS-switched CM; and
            updating the previous CM setting;
        completing booting of the OS; and
    using the OS-switched CM during runtime operation of the host platform.

2. The method of claim 1, further comprising:
    during a second platform boot process,
        booting the BIOS of the host platform;
        detecting a previous CM setting for the host platform and enabling use of the FW CM or SW CM based on the previous CM setting, the FW CM or SW CM that is enabled comprising a BIOS-enabled CM;
        performing an operating system (OS) handoff to the OS boot process;
        determining if the OS supports use of the BIOS-enabled CM;
        when the OS supports use of the BIOS-enabled CM, completing booting of the OS; and
    using the BIOS-enabled CM during runtime operation of the host platform.

3. The method of claim 1, wherein the host platform includes an Advanced Configuration and Power Interface (ACPI) component or block and the previous CM setting comprises an operating system capabilities (OSC) bit that is accessed via the BIOS.

4. The method of claim 1, wherein the BIOS comprises Universal Extensible Firmware Interface (UEFI) firmware, and the previous CM setting is stored as an EFI variable.

5. The method of claim 1, further comprising reconfiguring a host router in the USB4 controller in accordance with the OS-switched CM.

6. The method of claim 1, wherein the OS-switched CM is the SW CM, the USB4 controller includes host controller firmware, and the USB4 controller is directly or indirectly coupled to a USB4 fabric, further comprising operating the USB4 controller in a pass through operational mode under which configuration layer control packets originating from a SW CM driver associated with the SW CM are redirected by the host controller firmware to the USB4 fabric, and wherein configuration layer control packets originating from the USB4 fabric are redirected by the host controller firmware to the SW CM driver.

7. The method of claim 1, wherein the OS-switched CM is the FW CM, the USB4 controller includes host controller firmware, and the USB4 controller is directly or indirectly coupled to a USB4 fabric, further comprising operating the USB4 controller in a FW CM operational mode under which configuration layer control packets are forwarded from the host controller firmware to the USB4 fabric, and wherein configuration layer control packets originating from the USB4 fabric are forwarded to the host controller firmware.

8. The method of claim 1, further comprising:
enabling an original equipment manufacturer (OEM) to configure the USB4 controller to implement one of a native OS SW CM, a third-party SW CM, or a FM CM; and
in response to launching a CM for the host platform that is different than the CM configured for the USB4 controller,
switching the CM that is launched to the CM configured for the USB4 controller.

9. The method of claim 1, wherein the OS for the host platform used for a previous boot corresponding to the previous CM configuration is a first version of a Microsoft Windows OS that does not include a SW CM, further comprising:
booting the BIOS of the host platform;
detecting the previous CM setting for the host platform corresponds to the FW CM;
performing an operating system (OS) handoff from BIOS to an OS boot process for a second version of a Microsoft Windows OS comprising an upgrade of the first version of a Microsoft Windows OS that includes a SW CM;
switching the CM to the SW CM;
updating the previous CM setting;
completing booting of the OS; and
using the SW CM during runtime operation of the host platform.

10. The method of claim 8, further comprising updating configuration information for the CM configured for the USB4 controller using a 4-part identifier (ID).

11. A host platform comprising:
a System on a Chip (SoC) processor, including,
a plurality of processor cores;
a memory controller;
one or more Input/Output (I/O) interfaces;
memory, communicatively coupled to the memory controller;
a USB4 controller, comprising,
a discrete component communicatively coupled to the SoC processor via at least one I/O interface; or
a USB4 controller block embedded in the SoC processor;
the USB4 controller having a firmware-based (FW) connection manager (CM);
one or more storage devices in which firmware instructions including a BIOS are stored;
one or more storage devices in which software instructions for an operating system (OS) are stored, including software instructions associated with a software-based (SW) CM;
wherein, upon loading of the firmware instructions and software instructions into memory and execution of the firmware instructions and software instructions the host platform is enabled to,
during a first platform boot process,
boot the BIOS;
detect a previous CM setting for the host platform and enable the FW CM or SW CM based on the previous CM setting, the FW CM or SW CM that is enabled comprising a BIOS-enabled CM;
perform an OS handoff from BIOS to an OS boot process;
determining if the OS supports use of the BIOS-enabled CM;
when the OS does not support use of the BIOS-enabled CM,
switch to a CM that is supported by the OS comprising one of the FW CM or SW CM, the CM that is switched to comprising an OS-switched CM; and
update the previous CM setting;
complete booting of the OS; and
use the OS-switched CM during runtime operation of the host platform.

12. The host platform of claim 11, wherein execution of the firmware instructions and software instructions further enables the host platform to:
during a second platform boot process,
boot the BIOS of the host platform;
detect a previous CM setting for the host platform and enable use of the FW CM or SW CM based on the previous CM setting, the FW CM or SW CM that is enabled comprising a BIOS-enabled CM;
perform an operating system (OS) handoff to the OS boot process;
determine if the OS supports use of the BIOS-enabled CM;
when the OS supports use of the BIOS-enabled CM, complete booting of the OS; and
use the BIOS-enabled CM during runtime operation of the host platform.

13. The host platform of claim 11, wherein the host platform includes an Advanced Configuration and Power Interface (ACPI) component or block and the previous CM setting comprises an operating system capabilities (OSC) bit, wherein execution of the firmware instructions further enables the host platform to access the OSC bit.

14. The host platform of claim 11, wherein the BIOS comprises Universal Extensible Firmware Interface (UEFI) firmware, and the previous CM setting is stored as an EFI variable, wherein execution of the firmware instructions further enables the host platform to access the previous CM setting via the EFI variable.

15. The host platform of claim 11, wherein execution of at least one of the firmware instructions and software instructions further enables the host platform to reconfigure a host router in the USB4 controller in accordance with the OS-switched CM.

16. The host platform of claim 11, wherein the OS-switched CM is the SW CM, the USB4 controller includes host controller firmware, and the USB4 controller is directly or indirectly coupled to a USB4 fabric, wherein execution of the firmware instructions further enables the host platform to operate the USB4 controller in a pass through operational mode under which configuration layer control packets originating from a SW CM driver associated with the SW CM are redirected to the USB4 fabric, and wherein configuration layer control packets originating from the USB4 fabric are redirected to the SW CM driver.

17. The host platform of claim 11, wherein the OS-switched CM is the FW CM, the USB4 controller includes host controller firmware, and the USB4 controller is directly or indirectly coupled to a USB4 fabric, wherein execution of the firmware instructions further enables the host platform to operate the USB4 controller in a FW CM operational mode under which configuration layer control packets are forwarded from the host controller firmware to the USB4 fabric, and wherein configuration layer control packets originating from the USB4 fabric are forwarded to the host controller firmware.

18. The host platform of claim 11, wherein the USB4 controller is configured by an original equipment manufacturer (OEM) of the host platform to implement one of a native OS SW CM, a third-party SW CM, or a FM CM, and wherein execution of at least one of the firmware instructions and software instructions further enables the host platform to:
- detect a CM for the host platform that is different than the CM configured for the USB4 controller has been launched; and,
- switch the CM that is launched to the CM configured for the USB4 controller.

19. The host platform of claim 18, wherein execution of at least one of the firmware instructions and software instructions further enables the host platform to update configuration information for the CM configured for the USB4 controller using a 4-part identifier (ID).

20. A semiconductor chip configured to be implemented in a host platform, comprising:
- a USB4 controller block including,
    - a processing element;
    - memory;
    - a host interface;
    - a DisplayPort (DP) interface;
    - one or more USB4 interfaces; and
    - firmware instructions configured to be executed on the processing element to enable the USB4 controller block to:
        - implement a firmware-based (FW) connection manager (CM); and
        - operate in a pass-through operational mode under which,
            - control packets received from a software-based (SW) CM operating on the host platform via the host interface are redirected to a USB4 fabric coupled to a USB4 interface from among the one or more USB4 interfaces; and
            - control packets received from the USB4 fabric via the USB4 interface are redirected to the SW CM via the host interface,
        - wherein the control packets are used to configure at least one of a USB4 peripheral device and a USB4 hub in the USB4 fabric.

21. The semiconductor chip of claim 20, wherein execution of the firmware instructions on the processing element further enable the USB4 controller block to:
- operate in a FW CM operational mode under which the FW CM is used to,
    - generate control packets and send the control packets to a USB4 fabric coupled to a USB4 interface from among the one or more USB4 interfaces; and
- receive control packets from the USB4 fabric via the USB4 interface.

22. The semiconductor chip of claim 20, wherein the semiconductor chip is a System on a Chip (SoC) including a plurality of processor cores communicatively coupled to an interconnect hierarchy to which the host interface and DP interface are coupled, and wherein the USB4 controller block is embedded in the SoC.

23. The semiconductor chip of claim 20, wherein the semiconductor chip is a discrete component and the host interface and DP interface are external interfaces.

24. The semiconductor chip of claim 20, wherein the USB4 controller block is configured by an original equipment manufacturer (OEM) of the host platform to implement one of a native OS SW CM, a third-party SW CM, or a FM CM, and wherein execution of the firmware instructions further enables the USB4 controller block to:
- detect the CM configured for the USB4 controller block; and,
- provide information identifying the CM configured for the USB4 controller block to an operating system on the host platform.

\* \* \* \* \*